United States Patent [19]

Argumedo et al.

[11] 4,396,967
[45] Aug. 2, 1983

[54] MULTIELEMENT MAGNETIC HEAD ASSEMBLY

[75] Inventors: Armando J. Argumedo; William W. Chow; Lowell E. Dunn; Billy R. Lakey, all of Tuscon, Ariz.

[73] Assignee: International Business Machines Corporation, Armonk, N.Y.

[21] Appl. No.: 253,959

[22] Filed: Apr. 13, 1981

[51] Int. Cl.³ .............................................. G11B 5/27
[52] U.S. Cl. .................................... 360/121; 360/125; 29/603
[58] Field of Search ....................... 360/121, 119–120, 360/122–123, 125, 127; 29/603

[56] References Cited

U.S. PATENT DOCUMENTS

| 3,145,452 | 8/1964 | Camras | 360/125 X |
| 3,157,748 | 11/1964 | Eldredge | 29/603 |
| 3,613,228 | 10/1971 | Cook et al. | 29/603 |
| 3,859,663 | 1/1975 | Best et al. | 360/121 |
| 3,925,884 | 12/1975 | Case | 360/127 X |
| 4,366,518 | 12/1982 | Chow et al. | 360/121 |

OTHER PUBLICATIONS

IBM/TDB vol. 7, No. 11, Apr. 1965, p. 993, "Fabrication of Narrow Track Width, High–Density Ferrite Heads", by Frost et al.

Primary Examiner—John H. Wolf
Attorney, Agent, or Firm—Henry E. Otto, Jr.; Nathan N. Kallman

[57] ABSTRACT

A multielement magnetic head is formed with a closure section having a nonmagnetic ceramic substrate on which a thin layer of magnetic ferrite is deposited and processed. The thin ferrite layer is cut to define the separate transducing elements and data track separation. The closure section is joined to a wafer formed from a ferrite substrate and a thin film conductive coil means.

3 Claims, 7 Drawing Figures

MULTIELEMENT MAGNETIC HEAD ASSEMBLY

DESCRIPTION

TECHNICAL FIELD

This invention relates to a multielement magnetic head, and in particular to a simplified assembly of a ferrite magnetic head useful for recording data on multiple tracks of a magnetic medium.

An object of this invention is to provide a multielement magnetic head assembly that simplifies the machining process and realizes a high yield in production.

Another object of this invention is to provide a multielement magnetic head assembly that allows close separation between recorded tracks with reduction in the tolerances for track position and track width.

Another object is to provide a multielement magnetic head assembly that employs a relatively small quantity of ferrite with a significant reduction in costs.

Another object is to provide a multielement magnetic head assembly that is more precise in track position than was previously possible.

BACKGROUND ART

Presently, some types of multitrack or multielement magnetic heads used for magnetic tape recorders are constructed from ferrite sections separated by glass. The ferrite is initially machined and lapped into rectangular blocks, and saw cut to allow the insertion of glass between the sections that will define track width. It is generally necessary to use a relatively thick ferrite layer to minimize cracking of the brittle ferrite material during cutting and processing. Apparently, the amount of ferrite material used is for mechanical strength, and is not required for electrical or magnetic considerations. Also, it is necessary to have precise spacing between the cuts in the ferrite, as well as parallelism of the slots that are cut so that data signals may be properly recorded on the multiplicity of closely adjacent tracks. It would be desirable to use a multiplicity of narrow or thin saws or cutters joined in precise parallel alignment and uniformly spaced. However, if the cutter saws were too thin, the saws would tend to wobble when cutting through a thick ferrite layer.

BRIEF DESCRIPTION OF THE DRAWING

The invention will be described in detail with reference to the drawing in which.

DESCRIPTION OF THE PREFERRED EMBODIMENT

With reference to FIGS. 1A–D, the process of fabricating a closure piece for magnetic head assembly includes the step of forming a sandwich structure (FIG. 1A) of a ferrite layer 10, disposed between layers 12 and 14 of nonmagnetic barium titanate ceramic (BTC). The ferrite is preferably diffusion bonded to the BTC layers. Diffusion may be accomplished in a fixture which is maintained at 900° Centigrade for one hour at 50 thousand lbs. per square inch pressure, by way of example. Alternatively, the layers may be glass bonded, in a well known manner.

Figure 1A:
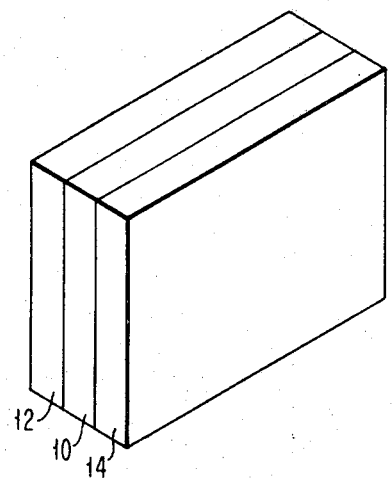
FIGS. 1A through 1D are isometric views illustrating the process steps for fabricating a closure piece for a magnetic write head, in accordance with this invention.
Figure 1B:
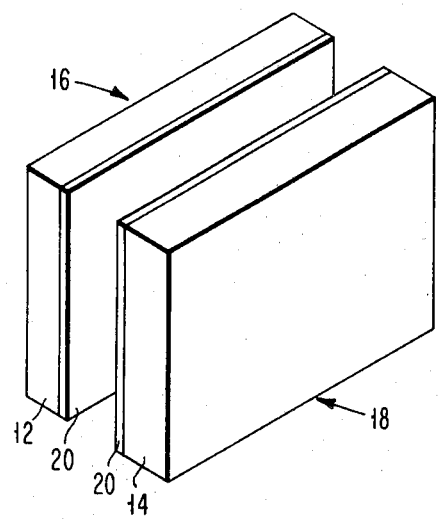

The sandwich structure is sliced centrally along the length of the ferrite layer, i.e., in the longitudinal direction, to produce two similar laminates 16 and 18, each having a relatively thin layer of ferrite 20 and 22 respectively, supported by the relatively thick BTC substrate 12 and 14 (FIG. 1B). The laminates 16 and 18 are ground, lapped and polished to a desired thickness. For example, the ferrite layers 20 and 22 may each be about 0.20 mm. thick and the BTC layers 12 and 14 about 2.0 mm. thick.

Figure 1C:
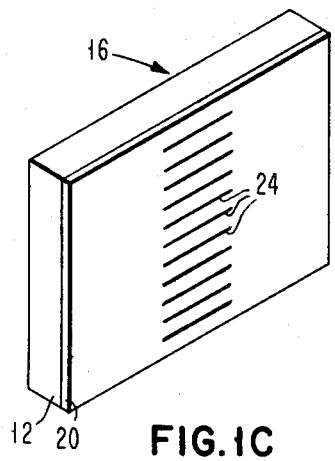

The surface of the exposed ferrite layer 20 of laminate 16 is saw cut toward the BTC layer 12 to a depth of about 0.25 millimeters, such that the resultant slots 24 are about 50 microns wide and 1.5 mm. long, by way of example. The BTC layer 12 serves as a support for the ferrite layer 20 and minimizes cracking and breakage during processing of the ferrite. The slots 24 are filled with a high temperature glass in a liquid state which solidifies when cooled (FIG. 1C). Grooves 26 and 28 are cut through the ferrite layer 20, exposing the BTC layer 12 at the grooved areas, thereby separating the slotted ferrite region from the remaining ferrite.

Figure 1D:
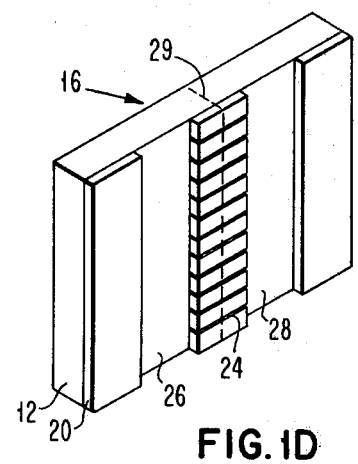
Figure 1E:
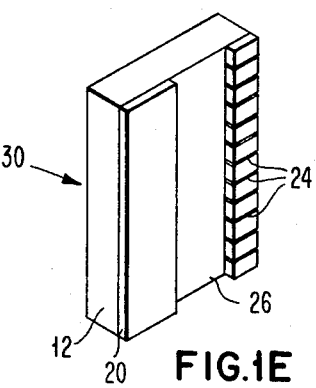
FIG. 1E is an isometric view of a completed magnetic head closure piece.

The slotted grooved laminate is then bisected by a transverse cut 29 through the center of the slotted area and the BTC layer 12, as shown in FIG. 1D. As a result, two completed closure pieces 30, such as illustrated in FIG. 1E, are obtained. The laminate 18 is processed in the same manner as laminate 16 to provide two additional similar closure pieces.

Figure 3:
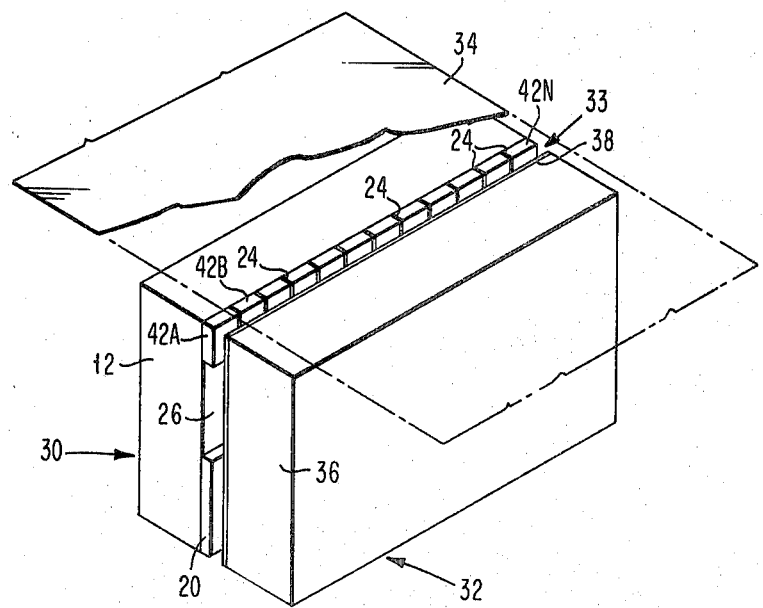
FIG. 3 is an isometric view of a magnetic write head assembly formed with the closure piece of FIG. 1E and the wafer, the closure piece and wafer being shown as separated for the purpose of clarity and explanation.

To complete the magnetic head assembly, the closure piece 30 is joined, by epoxy for example, to a wafer 32 that will form the transducing gap 33 and complete the magnetic flux path. The wafer 32 includes electrical coils and leads for conducting current representative of signals to be recorded on or read out from a magnetic medium or tape 34 (FIG. 3).

Figure 2:
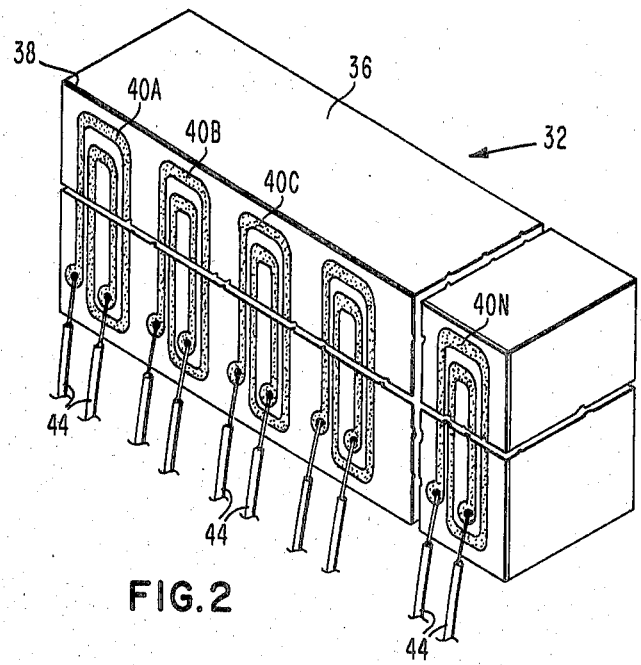
FIG. 2 is an isometric side view of a wafer, partly broken away, depicting an arrangement of conductive coils associated with a series of elements of multielement magnetic heads, according to this invention.

As shown in FIG. 2, the wafer 32 is formed with a ferrite substrate 36 on which a spacing layer 38 of $Al_2O_3$ is deposited by sputtering for example. A series of thin film conductive coils 40A–N, which may be made of gold, copper or aluminum, are vapor deposited in a common plane on the spacing layer 38, and are positioned so that each discrete coil 40A–N is associated with a corresponding track element 42A–N, represented in FIG. 3. Electrical leads 44 are solder connected to the terminals of each coil to enable passing current to and from the coils for interaction with the magnetic circuit of the head assembly.

By virtue of this invention that employs a hard ceramic substrate to support a thin ferrite which is bonded to the substrate by a diffusion process, the ferrite may be penetrated and slotted to a shallow depth. The shallow cuts allow the use of smaller and narrower cutting saws and wheels that are more accurate than those conventionally used to saw ferrite material used in magnetic head manufacture. In this way, parallelism and precise spacing of the tracks are more easily achieved. Less ferrite material is needed, and the reduction of ferrite breakage improves production yields. Furthermore, only a single glass is needed for this novel construction, as compared to the magnetic head structures that require a two glass bonding, i.e., a high termperature and a low temperature glass.

It should be understood that the invention is not necessarily limited to the materials and dimensions set forth in the specification, and that modifications may be made to the multielement magnetic head assembly disclosed herein within the scope of the invention.

What is claimed is:

1. A multielement magnetic head assembly comprising a closure member including a hard ceramic substrate, two thin layers of ferrite material of substantially identical thickness adhered to one face of said substrate and separated by a space, one of said layers has a plurality of slots in a direction normal to said face of the substrate to form a plurality of substantially identical uniformly spaced thin ferrite elements, the other layer being devoid of such slots, a wafer including a ferrite substrate, a thin spacing layer of dielectric material adhered to one face of the ferrite substrate, a plurality of conductive coils deposited flatwise on the spacing layer, and electrical leads assoicated with each coil, said closure member and wafer being joined such that a respective one of the coils is disposed adjacent a corresponding one of the ferrite elements, and said space provides an exit path for the leads, said other layer serving as a spacer to maintain parallelism between said substrates.

2. A multielement magnetic head assembly as in claim 1, wherein said ceramic substrate is made of barium titanate.

3. A multielement magnetic head assembly as in claim 1, wherein said ferrite elements are separated by glass filling the slots.

* * * * *